United States Patent
Gourishankar et al.

(10) Patent No.: US 11,211,642 B2
(45) Date of Patent: Dec. 28, 2021

(54) TREATMENT PROCESSES FOR ELECTROCHEMICAL CELLS

(71) Applicant: General Electric Company, Schenectady, NY (US)

(72) Inventors: Karthick Vilapakkam Gourishankar, Bangalore (IN); Satya Kishore Manepalli, Bangalore (IN); Job Thomas Rijssenbeek, Niskayuna, NY (US); Hari Nadathur Seshadri, Bangalore (IN); Anbarasan Viswanathan, Bangalore (IN)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 15/838,419

(22) Filed: Dec. 12, 2017

(65) Prior Publication Data

US 2018/0166748 A1 Jun. 14, 2018

(30) Foreign Application Priority Data

Dec. 12, 2016 (IN) .............................. 201641042297

(51) Int. Cl.
*H01M 10/42* (2006.01)
*H01M 10/39* (2006.01)
(Continued)

(52) U.S. Cl.
CPC ....... *H01M 10/4207* (2013.01); *H01M 4/364* (2013.01); *H01M 4/38* (2013.01);
(Continued)

(58) Field of Classification Search
CPC .......... H01M 10/4207; H01M 10/399; H01M 10/443; H01M 10/446; H01M 4/381;
(Continued)

(56) References Cited

U.S. PATENT DOCUMENTS 4,312,927 A    1/1982  Salmon
8,178,231 B2   5/2012  Soloveichik et al.
(Continued)

FOREIGN PATENT DOCUMENTS

WO    WO-2015068013 A1 *  5/2015

OTHER PUBLICATIONS

Spotnitz, R., "Simulation of capacity fade in lithium-ion batteries," Journal of Power Sources, vol. 113, Issue 1, pp. 72-80 (2003).
(Continued)

*Primary Examiner* — Edward J. Schmiedel
(74) *Attorney, Agent, or Firm* — Dority & Manning, P.A.

(57) ABSTRACT

A process for treating an electrochemical cell is presented. The process includes charging the electrochemical cell in a discharged state to at least 20 percent state-of-charge of an accessible capacity of the electrochemical cell at a first temperature to attain the electrochemical cell in a partial state-of-charge or a full state-of-charge and holding the electrochemical cell in the corresponding partial state-of-charge or full state-of-charge at a second temperature. The first temperature and the second temperature are higher than an operating temperature of the electrochemical cell.

16 Claims, 3 Drawing Sheets

(51) Int. Cl.
    *H01M 4/38*     (2006.01)
    *H01M 4/58*     (2010.01)
    *H01M 4/36*     (2006.01)
    *H01M 10/44*     (2006.01)
    *H01M 50/431*     (2021.01)
    *H01M 50/463*     (2021.01)

(52) U.S. Cl.
    CPC ........... *H01M 4/381* (2013.01); *H01M 4/582* (2013.01); *H01M 10/399* (2013.01); *H01M 10/443* (2013.01); *H01M 10/446* (2013.01); *H01M 50/431* (2021.01); *H01M 50/463* (2021.01); *H01M 2220/10* (2013.01); *H01M 2300/0057* (2013.01)

(58) Field of Classification Search
    CPC ........ H01M 4/582; H01M 4/38; H01M 4/364; H01M 2/1646; H01M 2/18
    See application file for complete search history.

(56) References Cited

U.S. PATENT DOCUMENTS

| | | |
|---|---|---|
| 8,329,336 B2 | 12/2012 | Soloveichik et al. |
| 8,343,661 B2 | 1/2013 | Gallowy et al. |
| 8,697,279 B2 | 4/2014 | Kniajanski et al. |
| 9,257,698 B2 | 2/2016 | Galloway et al. |
| 2006/0177736 A1* | 8/2006 | Murata ................. H01M 4/383 429/218.2 |
| 2010/0058578 A1 | 3/2010 | Vallance et al. |
| 2012/0164524 A1 | 6/2012 | Bogdan, Jr. et al. |
| 2012/0219843 A1 | 8/2012 | Bogdon, Jr. et al. |
| 2013/0108931 A1 | 5/2013 | Hart et al. |
| 2013/0196224 A1 | 8/2013 | Kim et al. |
| 2014/0152265 A1 | 6/2014 | Northey et al. |
| 2016/0268648 A1 | 9/2016 | Ueno et al. |

OTHER PUBLICATIONS

Extended European Search Report and Opinion issued in connection with corresponding EP Application No. 17204988.4 dated Mar. 15, 2018.

\* cited by examiner

TREATMENT PROCESSES FOR ELECTROCHEMICAL CELLS

BACKGROUND

The present disclosure generally relates to electrochemical cells. More specifically, the present disclosure relates to processes for treating the electrochemical cells, for example sodium-metal halide cells to achieve increased cycle life.

A battery is a device that includes one or more electrochemical cells, and converts stored chemical energy into electrical energy. In some applications, one or more batteries are used to store a portion of the energy in mobile systems such as electric vehicles and hybrid electric vehicles. Examples include locomotives, off-highway mining vehicles, marine applications, buses, and automobiles. The batteries can also be used in stationary applications, such as utility-scale energy storage systems, uninterruptible power supply (UPS) systems and diesel-battery hybrid systems for off-grid or weak-grid telecommunication stations. High-temperature sodium-metal halide batteries are often targeted for many of these applications.

A sodium-metal halide battery is typically made of many sodium-metal halide cells. A sodium-metal halide cell usually includes an anode including sodium; a cathode including nickel, sodium chloride and sodium tetra-chloroaluminate; and a solid electrolyte separating the anode and the cathode. Multiple sodium-metal halide cells can be connected in series or parallel in the sodium-metal halide battery. Such batteries are of great interest because of their high-energy density, safety and ability to operate over a wide temperature range.

Current development of the sodium-metal halide cells is directed towards improving the performance and the cycle life. One major factor that affects the cycle life of the sodium-metal halide cells is the capacity fade that may be related to the degradation of the cathode material during charge/discharge cycles. There have been several attempts at reducing the capacity fade of the sodium-metal halide cells. Most of these approaches focused on reducing grain growth in the cathode material or placing limits on the operation of the cells e.g., limiting deep discharges or excursion to high charge voltages or temperatures. However, these approaches might have disadvantages such as low capacities and/or reduced performance.

There continues to be a growing need in the art for improved solutions to increase the cycle life of electrochemical cells such as sodium-metal halide cells.

BRIEF DESCRIPTION

Some embodiments are directed to a process for treating an electrochemical cell. The process includes charging the electrochemical cell in a discharged state to at least 20 percent state-of-charge of an accessible capacity of the electrochemical cell at a first temperature to attain the electrochemical cell in a partial state-of-charge or a full state-of-charge and holding the electrochemical cell in the corresponding partial state-of-charge or full state-of-charge at a second temperature. The first temperature and the second temperature are higher than an operating temperature of the electrochemical cell.

In one embodiment, a process for treating a sodium-metal halide cell includes charging the sodium-metal halide cell in a discharged state to at least 30 percent state-of-charge of an accessible capacity of the sodium-metal halide cell at a first temperature to attain the sodium-metal halide cell in a partial state-of-charge and holding the sodium-metal halide cell in the corresponding partial state-of-charge at the first temperature for a duration of time in a range of from about 30 hours to about 100 hours. The first temperature is in a range of from about 350 degrees Celsius to about 500 degrees Celsius.

In another embodiment, a process for treating a sodium-metal halide cell includes charging the sodium-metal halide cell in a discharged state at a first temperature to attain the sodium-metal halide cell in a full state-of-charge and holding the sodium-metal halide cell in the full state-of-charge at the first temperature for a duration of time in a range of from about 30 hours to about 100 hours. The first temperature is in a range of from about 350 degrees Celsius to about 500 degrees Celsius.

BRIEF DESCRIPTION OF THE DRAWINGS

These and other features, aspects, and advantages of the present disclosure will become better understood when the following detailed description is read with reference to the accompanying drawings, wherein.

DETAILED DESCRIPTION

Figure 1:
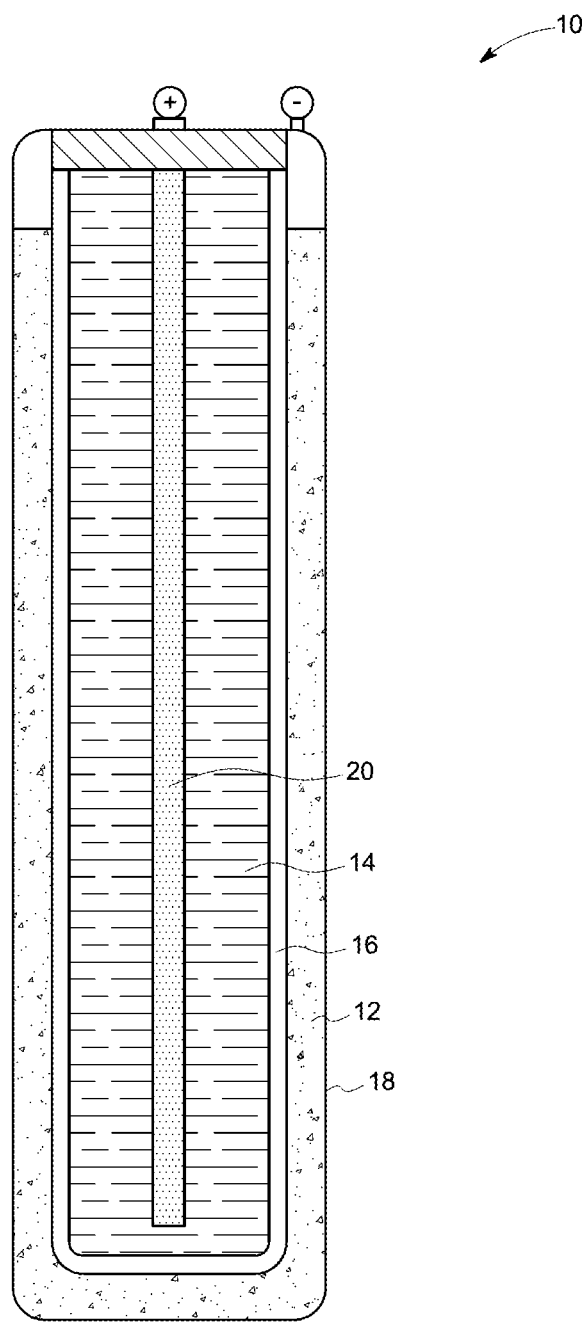
FIG. 1 is a schematic, cross-sectional view of an electrochemical cell, in accordance with some embodiments of the disclosure.

The disclosure generally encompasses embodiments that relate to processes for treating electrochemical cells for improving their cycle life and performance. As discussed in detail below, some embodiments of the present disclosure provide a charging protocol for treating the electrochemical cells prior to operating the electrochemical cells for use. These embodiments advantageously provide processes for reducing the capacity fade and improving the cycle life of the electrochemical cell. Though the present discussion provides examples in the context of sodium-metal halide cells, these processes may be applicable to other electrochemical cells, for example nickel or iron-containing electrochemical cells for improving their cycle life.

In a typical sodium-metal halide cell, a cathode material is constructed by mixing the ingredients and compacting the mixture into granules. The granules are filled into a cathode chamber of the sodium-metal halide cell. The granules subsequently establish a cathode structure during an initial charge and/or subsequent charge/discharge cycling. The cathode structure, so-formed after the initial charge, may be highly variable and prone to non-uniform current distribution because of the inconsistent electrically-conductive network (granule-to-granule contact) and/or non-uniform distribution of a molten electrolyte in the granules. This inconsistency and non-uniformity of the cathode material may provide a degraded cathode that leads to capacity fade and degradation of the sodium-metal halide cells during the subsequent charge/discharge cycling. Furthermore, the initial variability between several sodium-metal halide cells in a battery can accelerate degradation during the charge/discharge cycling.

As used herein, the term "capacity fade" refers to a rate of loss in accessible capacity of an electrochemical cell with the use of the electrochemical cell.

As used herein, the term "accessible capacity" of an electrochemical cell is generally defined as a capacity discharged at a low discharge rate (for example, C/10) from a full state-of-charge to a deep-discharge state that is defined by a limiting discharge voltage. Alternatively, accessible capacity may be defined as a capacity recharged at a low charge rate from a deep-discharge state or a fully discharged state to the full state-of-charge defined by a limiting charge voltage and current. The capacity of an electrochemical cell can be measured as a recharge capacity or a discharge capacity. As those skilled in the art understand, knowledge of the discharge time and given capacity of an electrochemical cell allows one to determine the discharge rate. The C/10 discharge rate can be defined as the rate which would discharge the nominal, rated capacity of the electrochemical cell in 10 hours. This discharge rate is independent of the number of electrochemical cells in a battery. In some embodiments, the accessible capacity of a sodium-metal halide cell is defined as a capacity discharged at a discharge rate C/10 to 1.8 volts per cell.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while considering that in some circumstances, the modified term may sometimes not be appropriate, capable, or suitable.

As used herein, the terms "cathode" and "cathode material", which may be used interchangeably, refer to a material that supplies electrons during charge and is present as part of a redox reaction. The terms, "anode" and "anode material", which may be used interchangeably, refer to a material that accepts electrons during charge and is present as part of the redox reaction.

As used herein, the term "electrolyte" refers to a medium that provides an ion transport mechanism between the cathode and anode of an electrochemical cell. Additives that facilitate the primary redox process, but do not themselves provide the primary redox process, are distinguished from the electrolyte itself. The electrochemical cell may also be referred to as an energy storage device, and these terms may be used interchangeably.

As discussed in detail below, some embodiments of the disclosure provide a process for treating an electrochemical cell in a discharged state. As used herein, the term, "an electrochemical cell in a discharged state" refers to an electrochemical cell at less than 10 percent state-of-charge of an accessible capacity of the electrochemical cell. In some embodiments, the electrochemical cell in a discharged state refers to a newly-assembled or newly-built electrochemical cell. In some embodiments, the electrochemical cell in a discharged state refers to a cycled-electrochemical cell that has performed several charge/discharge cycles. The cycled-electrochemical cell may also be referred to as a degraded-electrochemical cell, and these terms may be used interchangeably throughout the specification. The treatment process as described herein may be applicable to a newly-built electrochemical cell or a cycled-electrochemical cell to improve the cycle life of the corresponding electrochemical cell and/or rejuvenate the cycled-electrochemical cell.

In some embodiments, the treatment process includes charging the electrochemical cell that is in a discharged state (as described previously) to at least 20 percent state-of-charge of an accessible capacity of the electrochemical cell at a first temperature to attain the electrochemical cell in a partial state-of-charge or a full state-of-charge, and holding the electrochemical cell in the corresponding partial state-of-charge or full state-of-charge at a second temperature. In some embodiments, the first temperature and the second temperature are higher than an operating temperature of the electrochemical cell. The second temperature may be higher than or equal to the first temperature. In certain embodiments, the second temperature is equal to the first temperature.

FIG. 1 illustrates a schematic of an electrochemical cell 10, for example a sodium-metal halide, in accordance with one embodiment. The electrochemical cell 10 includes an anode 12, a cathode 14 and a separator 16 that partitions the anode 12 and the cathode 14. In some embodiments, the anode 12 includes a sodium ion source, for example molten sodium and the cathode 14 includes a cathode material. In some embodiments, the cathode material includes an electroactive metal, an alkali metal halide, and a molten electrolyte. In the electrochemical cell 10, the anode 12 and the cathode 14 are in ionic communication through the separator 16. As used herein, the phrase "ionic communication" refers to the traversal of the ions between the anode 12 and the cathode 14 through the separator 16. The separator 16 may be ionically conducting while electrically insulating. In some embodiments, the separator 16 is an ionically conducting solid separator. In certain embodiments, the separator 16 is capable of transporting sodium ions between the anode 12 and the cathode 14. Suitable materials for the separator 16 may include beta'-alumina, beta"-alumina, beta'-gallate, beta"-gallate, zeolite, sodium super ionic conductor (NASICON) compounds, or combinations thereof. In certain embodiments, the separator 16 includes a beta"-alumina solid electrolyte (BASE).

The term "electroactive metal," as used herein, is a metal that oxidizes in a molten electrolyte (for example, molten sodium tetra-chloroaluminate), resulting in a metal halide salt during an electrochemical reaction. In some instances, the metal halide salt is formed above the oxidation potential of aluminum (about 1.58 V vs. Na/Na ion), and below the oxidation potential of chloride ions (about 3.6 V vs. Na/Na ion). Suitable electroactive metals include nickel, iron, chromium, copper, manganese, zinc, cobalt, or combinations thereof. In certain embodiments, the cathode material includes nickel and iron. The electroactive metal may be present in elemental form or in form of a salt, for example a halide or a sulfide.

The alkali metal halide includes a chloride, bromide, or iodide of an alkali metal. In some embodiments, the alkali metal includes sodium. Suitable examples of the alkali metal halides include sodium chloride, sodium bromide, sodium iodide, or combinations thereof. In certain embodiments, the cathode material includes sodium chloride. In these embodiments, the cathode material may further include sodium bromide, sodium iodide, or combinations thereof.

The molten electrolyte may include an ion-conducting salt having a melting temperature in a range of from about 120 degrees Celsius to about 300 degrees Celsius. In some embodiments, the molten electrolyte includes a complex metal halide such as sodium tetra-chloroaluminate (NaAlCl$_4$).

The electrochemical cell 10 further includes an anode current collector 18 and a cathode current collector 20. The anode current collector 18 is in electrical communication with the anode 12, and the cathode current collector 20 is in electrical communication with the contents of the cathode 14. Suitable materials for the anode current collector include iron, aluminum, tungsten, titanium, nickel, copper, molybdenum, carbon, or combinations thereof. Suitable materials for the cathode current collector include platinum, palladium, gold, nickel, carbon, tungsten, molybdenum, or combinations thereof.

FIG. 1 illustrates a non-limiting configuration or structure of an electrochemical cell 10. It should be understood that other types of electrochemical cells having different cell chemistry (e.g., anode and cathode compositions) and/or structure (e.g., with the anode and cathode reversed in position as compared to FIG. 1) are considered to be within the scope of the present disclosure.

Sodium-metal halide cells, for example sodium-nickel chloride cells conforming to the structure of the electrochemical cell 10 are generally assembled in a discharge state. The cathode 14 may be filled with the cathode material and the molten electrolyte, and the anode 12 may be essentially empty. Typically, during operation, the sodium-metal halide cell can be first charged by applying a voltage between the anode 12 and the cathode 14. On charge, the electroactive metal (M) reacts with sodium chloride in the cathode 14 to form sodium ions. The sodium ions, under the influence of an applied electrical potential, conduct through the molten electrolyte and the separator 16 to combine with the electrons from the external circuit to form sodium metal at the anode 12, and the chloride ions react with the electroactive metal to form a metal chloride at the cathode 14 and donate electrons back to the external circuit. During discharge, the sodium metal at the anode 12 donates electrons to the external circuit and sodium ions conduct through the separator 16 reversing the reaction to re-form sodium chloride at the cathode 14. The cell reactions are as follows (charging is to the right):

At cathode: $n\text{NaCl}+M \leftrightarrow MCl_n+n\text{Na}^++ne^-$

At anode: $n\text{Na}^++ne^- \leftrightarrow n\text{Na}$

Overall: $n\text{NaCl}+M \leftrightarrow MCl_n+n\text{Na}$

The charging of the sodium-metal halide cells is typically carried out using a constant current charging method, a constant voltage charging method or using a combination of constant current charging and constant voltage charging methods. In some embodiments, an operating temperature of a sodium-metal halide cell is in a range of from about 240 degrees Celsius to about 350 degrees Celsius.

In some embodiments, the electrochemical cells as described herein may be rechargeable over a plurality of charge/discharge cycles. In general, the electrochemical cell may be employed in a variety of applications; and the plurality of cycles for recharge may depend on factors such as charge and discharge currents, depth of discharge, cell voltage limits, and the like.

As noted previously, the present disclosure provides embodiments of a process for treating an electrochemical cell, for example a sodium-metal halide cell in a discharged state. The treatment process is performed prior to operating the electrochemical cell for use. In some embodiments, the treatment process includes charging the electrochemical cell in a discharged state to at least 20 percent state-of-charge of an accessible capacity of the electrochemical cell at a first temperature to attain the electrochemical cell in a partial state-of-charge or a full state-of-charge. That is, the electrochemical cell may be charged partially or fully. In some embodiments, the charging step includes charging the electrochemical cell to at least 30 percent state-of-charge of an accessible capacity of the electrochemical cell. In some embodiments, the charging step includes charging the electrochemical cell to at least 50 percent state-of-charge of an accessible capacity of the electrochemical cell. In certain embodiments, the charging step includes charging the electrochemical cell from about 50 percent to about 90 percent state-of-charge of an accessible capacity of the electrochemical cell. In some embodiments, the charging step includes charging the electrochemical cell up to about 100 percent state-of-charge of an accessible capacity of the electrochemical cell, i.e., to full state-of-charge. As used herein, the terms "full state-of-charge" and "top-of-charge" refers to more than 95 percent state-of-charge of an accessible capacity of an electrochemical cell.

An electrochemical cell in a partial state-of-charge may be referred to as "partially-charged electrochemical cell", and these terms may be used interchangeably throughout the specification. An electrochemical cell in a full state-of-charge or at top-of-charge may be referred to as a "fully-charged electrochemical cell", and these terms may be used interchangeably throughout the specification.

After performing the charging step, the treatment process includes holding the electrochemical cell in the corresponding partial state-of-charge or full state-of-charge at a second temperature. In some embodiments, the holding step includes heat-treating the partially-charged electrochemical cell or the fully-charged electrochemical cell at the second temperature. The holding step may be carried out for a duration of time, for example at least 6 hours. In some embodiments, the holding step may be carried out for at least 20 hours. In some embodiments, the holding step may be carried out for more than 24 hours. In some embodiments, the holding step may be carried out for a duration of time in a range of from about 30 hours to about 100 hours. In certain embodiments, the holding step may be carried out for a duration of time in a range of from about 48 hours to about 90 hours. In some instances, it may be desirable to hold the partially-charged or fully-charged electrochemical cell at the second temperature for more than 100 hours. This holding step may be performed at a combination of time and temperature selected to achieve the desired properties.

In embodiments where the electrochemical cell is charged to attain a partial state-of-charge, the holding step includes holding the partially-charged electrochemical cell in the corresponding partial state-of-charge at the second temperature. In embodiments where the electrochemical cell is charged to the full state-of-charge, the holding step includes holding the fully-charged electrochemical cell in the corresponding full state-of-charge at the second temperature.

As noted, the charging step may be performed at the first temperature and the holding step may be performed at the second temperature. In some embodiments, both the first temperature and the second temperature are higher than an operating temperature of the electrochemical cell. In some embodiments, the first temperature and the second temperature, individually are higher than 330 degrees Celsius. In some embodiments, the first temperature and the second temperature individually are in a range of from about 350 degrees Celsius to about 500 degrees Celsius. In certain embodiments, the first temperature and the second temperature individually are in a range of from about 380 degrees Celsius to about 450 degrees Celsius. A temperature higher than 500 degrees Celsius may not be desirable for performing the charging step, the holding step or both for an electrochemical cell, for example a sodium-metal halide cell. At temperatures higher than 500 degrees Celsius, the sodium-metal halide cell may fail because of damage caused by a high differential pressure between the anode and the cathode. In some embodiments, the second temperature is equal to the first temperature. In other words, both the charging step and the holding step of the treatment process may be performed at a temperature higher than the operating temperature of the electrochemical cell. In some embodiments, both the charging step and the holding step of the treatment process are performed at a temperature in a range of from about 380 degrees Celsius to about 450 degrees Celsius.

In embodiments where the charging step is performed for charging the electrochemical cell in the discharged state to a partial state-of-charge to attain a partially-charged electrochemical cell, the treatment process further includes continuing charging the partially-charged electrochemical cell to attain the electrochemical cell in the full state-of-charge after performing the holding step. In some embodiments, the step of continuing charging the partially-charged electrochemical cell is performed at a third temperature. The third temperature may be lower than the first temperature and higher than the operating temperature of the electrochemical cell. In some embodiments, the third temperature is higher than 300 degrees Celsius and lower than 400 degrees Celsius. In some embodiments, the third temperature is in a range of from about 310 degrees Celsius to about 350 degrees Celsius. In certain embodiments, the step of continuing charging the partially-charged electrochemical cell to attain a fully-charged electrochemical cell is performed at a third temperature in a range of from about 310 degrees Celsius and about 350 degrees Celsius.

In some embodiments, the treatment process further includes holding the electrochemical cell in the discharged state at a fourth temperature higher than the operating temperature of the electrochemical cell prior to the charging step. In some embodiments, this holding step (that is performed prior to the charging step) includes heat-treating the electrochemical cell in the discharged state at the fourth temperature for a duration of time, for example more than 2 hours. In some embodiments, the fourth temperature is in a range of from about 350 degrees Celsius to about 500 degrees Celsius. In some embodiments, the fourth temperature is equal to the first temperature. In some embodiments, the step of holding the electrochemical cell in the discharged state prior to the charging step is carried out at the first temperature.

After completing the treatment process as described herein, the electrochemical cell may be subjected to operating the electrochemical cell for use or operating the electrochemical cell for applying any other treatment process known in the art, in continuation of the disclosed treatment process. Examples of other treatment processes include conditioning cycles as described in US Patent Publication No. 2014/0152265 A1.

The treatment process performed at a temperature higher than the operating temperature of the electrochemical cell as disclosed in some embodiments of the present disclosure advantageously provide improvements in reducing the capacity fade and degradation of the electrochemical cells. Without being bound by any theory, it is believed that these results may be attributed to an improved and robust cathode structure that facilitates a uniform current distribution and a high retention of electroactive elements in the cathode material. Some of these results are shown and described in detail below in the Example section. These improvements generally contribute to an enhanced cycle life of the electrochemical cells.

Some embodiments are directed to a process for treating a sodium-metal halide cell in a discharged state. The treatment process includes charging the sodium-metal halide cell in the discharged state to at least 30 percent state-of-charge of an accessible capacity of the sodium-metal halide cell at a first temperature to attain the sodium-metal halide cell in a partial state-of-charge and holding the partially-charged sodium-metal halide cell in the corresponding partial state-of-charge at the first temperature for a duration of time in a range of from about 30 hours to about 100 hours. In some embodiments, the holding step is performed for at least 48 hours. The first temperature may range from about 350 degrees Celsius to about 500 degrees Celsius. In some embodiments, the process further includes the step of continuing charging the partially-charged sodium-metal halide cell at a third temperature after completing the holding step to attain the sodium-metal halide cell in the full state-of-charge. The third temperature may range from about 320 degrees Celsius to about 400 degrees Celsius.

In some embodiments, a process for treating a sodium-metal halide cell in a discharged state includes charging the sodium-metal halide cell in the discharged state at a first temperature to attain the sodium-metal halide cell in a full state-of-charge and holding the fully-charged sodium-metal halide cell at the first temperature for a duration of time in a range of from about 30 hours to about 100 hours. In some embodiments, the holding step is performed for at least 48 hours. The first temperature may range from about 350 degrees Celsius to about 500 degrees Celsius.

In some embodiments, the electrochemical cell may be situated in an energy storage device, for example, a battery. The energy storage device includes a multitude of electrochemical cells electrically connected to each other. The multitude of electrochemical cells may be electrically connected in series, in parallel, or in a combination of series and parallel. The ratings for the power and energy of the energy storage device may depend on such factors as the number of electrochemical cells and the connection topology in the energy storage device. Other factors may be based on end-use application specific criteria. In some embodiments, the energy storage system includes a multitude of sodium-metal halide cells, and is referred to as sodium-metal halide battery.

Some embodiments of the disclosure are directed to a process for treating an electrochemical cell that is situated in the energy storage device including a multitude of electrochemical cells. In some embodiments, the treatment process is applied to the multitude of electrochemical cells simultaneously in the energy storage device. The treatment process may be applied to a multitude of electrochemical cells simultaneously, which are situated in a multitude of energy storage devices. In some embodiments, the treatment process may be applied to a multitude of energy storage devices simultaneously. Moreover, the treatment process may be applied on one or more electrochemical cells, on-site, without disassembling the energy storage device(s).

In one embodiment, the energy storage system is in the form of an uninterruptable power supply (UPS) device that provides power in case of a primary power loss. In one embodiment, the energy storage system is a part of a hybrid power system. In these embodiments, the energy storage system provides power when the primary power source (for example, a grid power, a solar photovoltaic, a wind turbine or a diesel generator) is unavailable, for example in weak-grid or off-grid applications. In one embodiment, the energy storage system is in the form of a battery that is used to minimize the fluctuations in a power output from an intermittent power source (for example, wind or solar energy source) or fluctuations in power demand (for example, a household, a commercial building, or an entire electrical grid).

EXAMPLES

The examples presented below are intended to be merely illustrative and should not be construed to be any sort of limitation on the scope of the claimed invention. Unless specified otherwise, all ingredients and components are commercially available from common chemical suppliers. Several electrochemical cells were built using the standard procedure for assembling sodium-nickel chloride cells. Each cell was assembled using a β"-alumina separator tube with a cloverleaf cross-section and a cathode material including the granules composition and the electrolyte as given in Table 1.

TABLE 1

| Electrolyte NaAlCl$_4$ | Cathode material | | | | | | |
|---|---|---|---|---|---|---|---|
| | Granules composition (weight percent) | | | | | | |
| (g) | NaCl | Ni | Fe | Al | NaF | NaI | FeS |
| 121.2 | 38.6 | 52 | 5.4 | 0.5 | 1.5 | 0.4 | 1.6 |

Example 1

Three cells (1-3) were assembled in the discharge state. Electrochemical testing of individual cells in the discharged state was performed using Digatron cyclers with a maximum current limit 100 amperes. Cells 1, 2, and 3 were tested using a testing protocol (A) (described below) including a partial state-of-charge (PSoC) cycling protocol that is an accelerated representative of telecom qualification testing followed by characterization cycling (that includes a low discharge cycle designed to simulate telecom discharge rates). The cycling was periodically interrupted at every 50 cycles to measure the recharge capacity of the cells using the characterization cycles. Prior to subjecting cells 1, 2, and 3 to the testing protocol (A), cells 1, 2, and 3 were treated using two different treatment protocols. Treatment protocol (a) represents a control treatment and treatment protocol (m) represents a comparative treatment (i.e., maiden charge).

Treatment Protocol (a)
  (i) Hold at 400° C. for 50 hours (h) before charge
  (ii) Charge to 19 Ah at 400° C.—starting at 100 mA and ramping up to 2.75 A over time, charge to 2.67V, then at 2.67V to a current of 500 mA
  (iii) Hold at 400° C. in the partial state-of-charge (19 Ah state-of-charge) for 72 hours
  (iv) Reduce the temperature to 325° C. and hold for 24 hours
  (v) Continue charge at 325° C. to attain full state-of-charge (top-of-charge)

Treatment Protocol (m)
  (i) Charge at 325° C. in following steps—at 100 mA for 2 hours followed by at 400 mA for 2 hours followed by at 800 mA for 2 hours followed by ramping up to 2.75 A over time, charge to 2.67V, then at 2.67V to a current of 500 mA.

Testing Protocol (A)
PSoC Cycling Protocol
  1. Discharge 27.6 Ah at −15 W to 2.1V
  2. Charge 13.8 Ah at 20 A to 2.67V, then at 2.67V down to 500 mA
  3. Discharge 13.8 Ah at −15 W to 2.1V
  4. Repeat steps 7 and 8, up to 50 times
Characterization Cycles
  5. Charge at 10 A to 2.67V, then at 2.67V down to 500 mA
  6. Discharge 27.6 Ah at −15 W
  7. Charge at 20 A to 2.67V, then at 2.67V down to 500 mA
  8. Discharge at −15 W to 1.95 V
  9. Charge at 10 A to 2.67V, then at 2.67V down to 500 mA (recharge capacity is measured in this step)
  10. Repeat steps (1-9)

Figure 2:
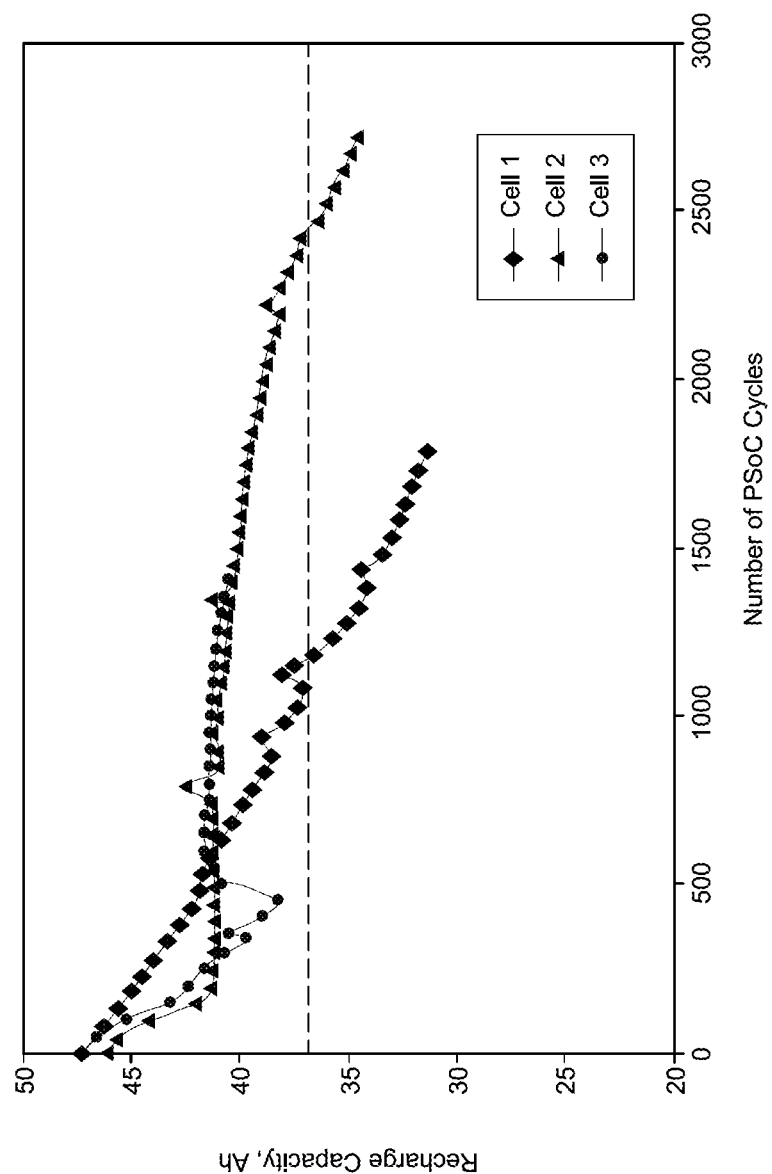
FIG. 2 is a graph representing recharge capacity of electrochemical cells as a function of number of partial state-of-charge cycles.

Cell 1 was subjected to the comparative treatment protocol (m) (step vi) followed by the testing protocol (A) including the PSoC cycling protocol followed by characterization cycles (steps 1-10). Cell 2 was subjected to the treatment protocol (a) (steps i-v) followed by the testing protocol (A) including the PSoC cycling protocol and characterization cycles (steps 1-10). Cell 3 was initially heat treated at 400° C. for 50 hours and then subjected to the comparative treatment protocol (m) (step-iv) followed by the testing protocol (A) (steps 1-10). Cell 3 showed a drop in recharge capacity in about 500 cycles (FIG. 2). At that stage, the degraded cell 3 was subjected to the treatment protocol (a) (steps i-iv) followed by the testing protocol (A) (steps 1-10).

FIG. 2 represents the recharge capacity as a function of number of PSoC cycles for cells 1, 2, and 3. The dotted horizontal line in the graph shows 80 percent of the initial accessible capacity of a sodium-nickel chloride cell. When the accessible capacity of a sodium-nickel chloride cell drops to less than 80 percent of the initial accessible capacity, the sodium-metal halide cell is usually considered to have reached its end of life for research and characterization purposes.

FIG. 2 clearly shows improvement in the cycle life (approximately double) of cell 2 that was treated using the treatment protocol (a) as compared to that of cell 1 that was treated using the treatment protocol (m). Although the initial recharge capacity of cell 2 was lower as compared to that of cell 1, the capacity fade was much lower in cell 2 as compared to cell 1. The recharge capacity of cell 2 dropped to 80% of the initial accessible capacity after about 2400 cycles as compared to that of cell 1 where the recharge capacity dropped to 80% of the initial accessible capacity in about 1200 cycles.

FIG. 2 further shows performance of cell 3. Cell 3 showed a high capacity fade by dropping the recharge capacity close to 80% of the maximum recharge capacity in about 500 cycles. FIG. 2 clearly shows improvement in the recharge capacity (~7% increase) and significant reduction in the capacity fade after subjecting the degraded cell 3 to the treatment protocol (a). This result showed that the treatment protocol (a) has the potential to rejuvenate degraded cells.

Example 2

Cells (4-10) were assembled in the discharged state. Electrochemical testing of individual cells in the discharged state was performed using Digatron cyclers with a maximum current limit 100 amperes. Cells 4-10 were tested using a testing protocol (B) (given below) including a deep-discharge cycling protocol that is an accelerated representation of a utility application duty cycles followed by characterization cycling that simulate accelerated testing for a utility application duty cycle and characterization cycles). The cycling was periodically interrupted at every 50 cycles to measure the discharge capacity of the cells using the characterization cycles. Prior to subjecting cells (4-10) to the testing protocol (B), cells (4-10) were treated using two different treatment protocols. Treatment protocol (b) represents a control treatment and treatment protocol (m) represents a comparative treatment (as described in example 1).

Treatment Protocol (b)
(i) Charge to top-of-charge at 400° C.—Starting at 100 mA and ramping up to 2.75 A over time, charge to 2.67V, then at 2.67V to a current of 500 mA
(ii) Hold at 400° C. in the full state-of-charge for up to 72 h
(iii) Reduce the temperature to 300° C. and start deep-discharge Testing Protocol (B)
Deep-Discharge Cycling Protocol
1. Discharge at −6.3 W to 2.08V
2. Charge up to 4.5 hours at 20 A to 2.67V, then at 2.67V down to 500 mA or up to 4.5 h
3. Repeat steps 5 and 6, 10 times Characterization Cycles
4. Charge at 15 A to 2.67V, then at 2.67V down to 500 mA.
5. Discharge at −4.5 A to 2.0V
6. Charge at 20 A to 2.67V, then at 2.67V down to 500 mA
7. Repeat steps 1-7

Cell 4 was subjected to the comparative treatment protocol (m) (steps vi) (as described in example 1) followed by the testing protocol (B) including the deep-discharge cycling protocol followed by characterization cycles (steps 1-7). The dotted horizontal line in the graph shows 80 percent of the initial accessible capacity of a sodium-nickel chloride cell. When the accessible capacity of a sodium-nickel chloride cell drops to less than 80 percent of the initial accessible capacity, the sodium-metal halide cell is usually considered to have reached its end of life for research and characterization purposes.

Cells (5-8) were subjected to the treatment protocol (b) (steps i-iii) followed by the testing protocol (B) including the deep-discharge cycling protocol and characterization cycles (steps 1-7). Cell 8 was hold at 400° C. before the charge step (i) for 48 hours. Cell 9 was tested similarly as described for cells (5-7) except the treatment protocol (b) was performed at 350° C. Cell 10 was tested similarly as described for cells (5-7) except the charge step (i) of the treatment protocol (b) was performed at 325° C. and the hold step (ii) was performed at 400° C. for 48 hours after the charge step (i). Further, the hold time during the hold step (ii) (i.e., after the charge step (i)) was varied for cells 5-10. Cells 5-8 were held, respectively, for 24 hours, 48 hours, and 72 hours during the hold step (ii). Table 2 shows process details (temperature, hold time before the charge step (i) and hold time during the hold step (ii) (i.e., after the charge step (i)) of the treatment protocol (b) applied to the cells (5-10). Table 2 further shows number of cycles for cells (5-10) to reach 80 percent of their initial accessible capacity.

TABLE 2

| Cell | Temperature (° C.) | Hold time before the charge step (i) (hours) | Hold time after the charge step (i) (hours) | Number of cycles to reach 80% of the initial accessible capacity |
|---|---|---|---|---|
| 5 | 400 | 0 | 24 | 60 |
| 6 | 400 | 0 | 48 | 250 |
| 7 | 400 | 0 | 72 | 115 |
| 8 | 400 | 48 | 48 | 115 |
| 9 | 350 | 0 | 72 | 60 |
| 10 | 325 | 0 | 48 (at 400° C.) | 70 |

Figure 3:
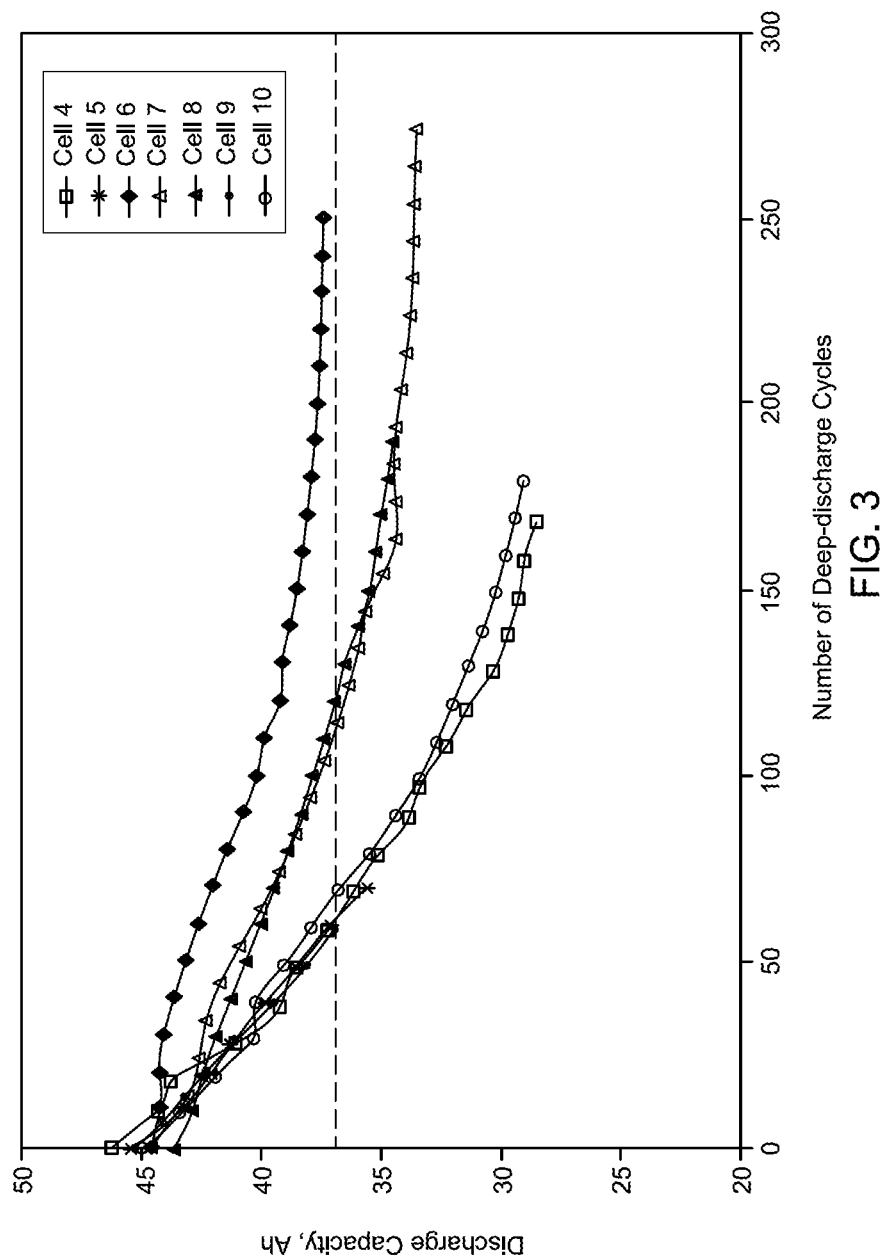
FIG. 3 is a graph representing discharge capacity of electrochemical cells as a function of number of deep-discharge cycles.

FIG. 3 shows discharge capacity as a function of number of deep-discharge cycles for cells (5-10) as compared to cell 4 that was subjected to the comparative treatment protocol (m) before going through the testing protocol (B). It was observed that by holding the charged cell 5 (after the charge step (i)) for 24 hours did not show any significant improvement with respect to cell 4. However, cells 6-8 that were held at 400° C. after the charge step (i) for 48 hours and 72 hours showed improved cycle lives by 2 to 3 times of the cycle life of cell 4. That is, increase in the hold times to 48 hours and 72 hours at 400° C. after the charge step (i) for cells 6-8 showed reduction in the capacity fade significantly. The discharge capacities of cells (6-8) dropped to 80% of their initial accessible capacity in higher number of cycles (more than 120 cycles) as compared to that of cell 4 where the discharge capacity dropped to 80% of its initial accessible capacity in less number of cycles (~60 cycles). Cells 9-10 that were subjected to treatment protocol (b) at temperatures 350° C. and 325° C. (close to the operating temperature ~300° C. of the sodium-nickel chloride cell) performed similarly to cell 4. However, an improvement in cycle life may be observed if hold time after the charge step (i) is increased to 100 hours or more.

It is clear from the above results that a sodium-nickel chloride cell that is subjected to the treatment process in accordance with some embodiments of the present disclosure, exhibits reduced capacity fade during charge/discharge cycles as compared to a similar cell that did not undergo the treatment process. The disclosed treatment process can be applied to newly-built electrochemical cells prior to an initial charge or to cycled-electrochemical cells for achieving enhanced cycle life and/or rejuvenating the cycled-electrochemical cells.

While several aspects of the present disclosure have been described and depicted herein, alternative aspects may be affected by those skilled in the art to accomplish the same objectives. Accordingly, it is intended by the appended claims to cover all such alternative aspects as fall within the true spirit and scope of the disclosure.

What is claimed is:
1. A process for treating an electrochemical cell, comprising:
holding the electrochemical cell in a discharged state at a first temperature that is higher than an operating temperature of the electrochemical cell, wherein the electrochemical cell is held in the discharged state for more than two hours prior to charging the electrochemical cell wherein the operating temperature of the electro- chemical cell is in the range of about 240 degrees Celsius to about 330 degrees Celsius;

charging the electrochemical cell in the discharged state to at least 20 percent state-of-charge of an accessible capability of the electrochemical cell at the first temperature to attain the electrochemical cell in a partial state-of-charge;

holding the electrochemical cell in the corresponding partial state-of-charge at a second temperature, wherein the first temperature and the second temperature are higher than the operating temperature of the electrochemical cell; and continuing charging the electrochemical cell in the partial state-of-charge at a third temperature to attain the electrochemical cell in a full state of charge, wherein the third temperature is higher than the operating temperature of the electrochemical cell.

2. The process of claim 1, wherein the first temperature and the second temperature independently are higher than 330 degrees Celsius.

3. The process of claim 2, wherein the first temperature, the second temperature, or both are in a range of from about 350 degrees Celsius to about 500 degrees Celsius.

4. The process of claim 1, wherein the second temperature is equal to the first temperature.

5. The process of claim 1, wherein the charging step comprises charging the electrochemical cell to at least 30 percent state-of-charge of the accessible capacity of the electrochemical cell.

6. The process of claim 1, wherein the holding the electrochemical cell in the corresponding partial state-of-charge at the second temperature is carried out for a duration of time at least 6 hours.

7. The process of claim 1, wherein the holding the electrochemical cell in the corresponding partial state-of-charge at the second temperature is carried out for a duration of time in a range of from about 30 hours to about 100 hours.

8. The process of claim 1, wherein the third temperature is in a range from about 310 degrees Celsius to about 350 degrees Celsius.

9. The process of claim 1, wherein the electrochemical cell comprises an anode that comprises sodium; a cathode that comprises at least one alkali metal halide and an electroactive metal; and a separator that partitions the anode and the cathode.

10. The process of claim 9, wherein the electroactive metal comprises nickel, iron, chromium, copper, manganese, zinc, cobalt, or combinations thereof.

11. The process of claim 9, wherein the alkali metal halide comprises sodium chloride.

12. The process of claim 1, wherein the electrochemical cell is situated within an energy storage device that comprises a multitude of electrochemical cells comprising the electrochemical cell, and wherein the multitude of electrochemical cells are electrically connected to each other.

13. The process of claim 12, wherein the process for treating an electrochemical cell is applied to the multitude of electrochemical cells simultaneously.

14. The process of claim 12, wherein the energy storage device is a sodium-metal halide battery.

15. A process for treating a sodium-metal halide cell, comprising:

holding the sodium-metal halide cell in a discharged state at a first temperature that is higher than an operating temperature of the sodium-metal halide cell, wherein the sodium-metal halide cell is held in the discharged state for more than two hours prior to charging the sodium-metal halide cell;

charging the sodium-metal halide cell in the discharged state to at least 30 percent state-of-charge of an accessible capacity of the sodium-metal halide cell at the first temperature to attain the sodium-metal halide cell in a partial state-of-charge, wherein the first temperature is in a range of from about 350 degrees Celsius to about 500 degrees Celsius;

holding the sodium-metal halide cell in the corresponding partial state-of-charge at the first temperature for a duration of time in a range of from about 30 hours to about 100 hours; and continuing charging the sodium-metal halide cell in the partial state-of-charge at a third temperature to attain the sodium-metal halide cell in a full state of charge, wherein the third temperature is higher than the operating temperature of the sodium-metal halide cell.

16. The process of claim 15, further comprising continuing charging the sodium-metal halide cell in the partial state-of-charge at a third temperature after completing the holding step to attain the sodium-metal halide cell in the full state-of-charge, wherein the third temperature is in a range of from about 330 degrees Celsius to about 400 degrees Celsius.

* * * * *